May 16, 1939.  F. M. SLATER  2,158,529
GUARD FOR ROCK DRILLS
Filed Sept. 10, 1937
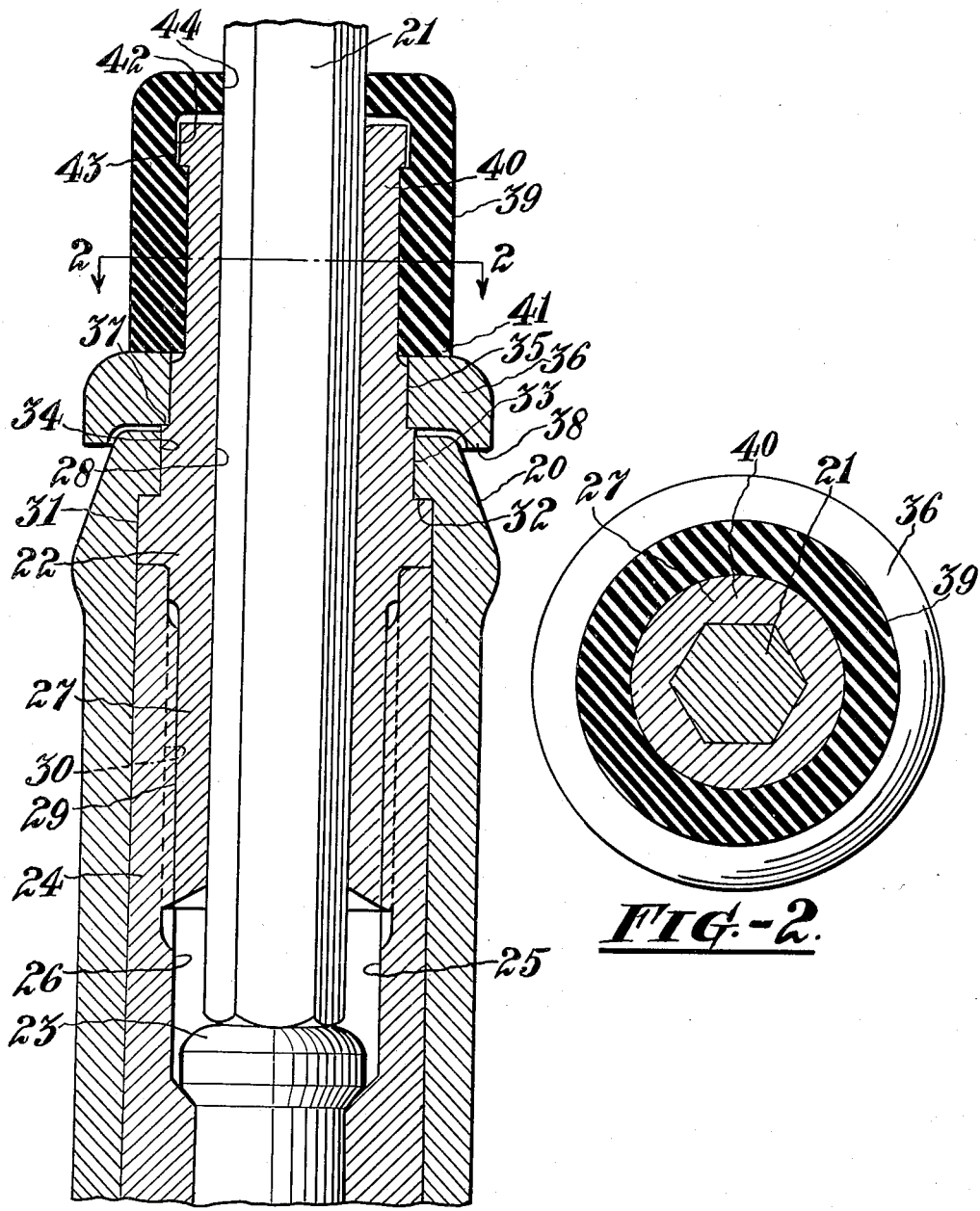
INVENTOR
*Fred M. Slater*
BY
HIS ATTORNEY.

Patented May 16, 1939

2,158,529

UNITED STATES PATENT OFFICE 2,158,529

GUARD FOR ROCK DRILLS

Fred M. Slater, Phillipsburg, N. J., assignor to Ingersoll-Rand Company, Jersey City, N. J., a corporation of New Jersey Application September 10, 1937, Serial No. 163,199

3 Claims. (Cl. 121—31)

This invention relates to rock drills, and more particularly to a guard for the front end of a rock drill.

One object of the invention is to prevent the entrance of abrasive material into the rock drill.

Another object is to enable the guard to be expeditiously attached to and detached from the rock drill.

Other objects will be in part obvious and in part pointed out hereinafter.

In the drawing accompanying this specification and in which similar reference numerals refer to similar parts, Figure 1 is an elevation of a rock drill equipped with a guard constructed in accordance with the practice of the invention, and Figure 2 is a transverse view taken through Figure 1 on the line 2—2.

Referring more particularly to the drawing, the invention is shown applied to a rock drill of the type employed for up-hole drilling and comprises a casing of which only a portion of a front head 20 is shown. A working implement, as for example a drill steel 21, extends into the front head and is guided by chuck mechanism 22 housed by the front head.

The rock drill may be provided with suitable rotation mechanism (not shown) for effecting rotary movement of the chuck mechanism in order to change the position of the working implement during the operation of the rock drill. The percussive element, such as a hammer piston whereby the working implement 21 is actuated for cutting a drilling hole, is not shown but its blow may be transmitted to the working implement by an anvil block 23 arranged in the chuck mechanism 22.

The form of chuck mechanism illustrated comprises a chuck sleeve 24 which may be connected in suitable manner with the rotation mechanism and serves as a guide for the anvil block 23. The chuck sleeve is hollow throughout and its bore 25 comprises a front enlarged portion 26 to accommodate a chuck bushing 27 having a bore 28 corresponding to the conformation of the working implement 21 which extends slidably therethrough and into engagement with the anvil block 23.

In the periphery of the portion of the chuck bushing 22 lying within the chuck sleeve 24 are longitudinally extending flutes 29 to receive ribs 30 in the bore 25 for interlocking the chuck bushing with the chuck sleeve. The chuck bushing extends exteriorly of the front head 20 and has a peripheral flange 31 which serves as an abutment for the front end of the chuck sleeve 24 and seats against a shoulder 32 in the front end of the front head 20.

The peripheral surface of the chuck bushing lying immediately forwardly of the flange 31 and designated 33 engages a bearing surface 34 in the front end of the front head to assist in maintaining the chuck bushing 27 coaxial with the chuck sleeve and, therefore, with the anvil block 23.

The surface 33 preferably extends a slight distance beyond the front end of the front head and the portion 35 of the chuck bushing in advance of the surface 33 is preferably of slightly reduced diameter to receive a guard plate 36 which seats upon a shoulder 37 at the juncture of the surface 33 and the portion 35 and overlies the front end of the front head to deflect debris from the surfaces 33 and 34. Preferably the guard plate 36 is provided with a depending skirt portion 38 which encircles the forward extremity of the front head to prevent cuttings and water from running along the lowermost surface of the guard plate 36 to the front end of the front head.

The cooperating surfaces of the guard plate 36 and the portion 35 are preferably of smooth cylindrical shape. They are in slidable engagement with each other so that the guard plate 36 may be conveniently placed in assembled position on the chuck bushing. In order to prevent relative rotary movement between the guard plate and the chuck bushing and to retain the guard plate seated firmly upon the shoulder 37 a resilient sleeve 39, preferably rubber, is disposed about the front portion 40 of the chuck bushing and seats with its rearward end 41 upon the adjacent end of the guard plate 36.

Near the front end of the sleeve 39 is an internal groove 42 to receive a peripheral flange 43 on the front extremity of the chuck bushing 27. The groove 42 is so located with respect to the end 41 that when the sleeve occupies its assembled position it will be slightly compressed to maintain the guard plate in firm engagement with the shoulder 37.

At the front end of the sleeve 39 is an introverted wall or flange which overlies the front end of the chuck bushing 27 and has an aperture 44 to accommodate the working implement 21. The aperture 44 is of the same cross sectional form as the working implement but preferably of slightly smaller area so that when the working implement is inserted into the chuck bushing the walls defining the aperture 44 will snugly engage the surface of the working implement to prevent the entrance of abradant into the chuck bushing 27.

In practice the present invention has been found to be a highly effective device for sealing the front end of a rock drill. The deflectors, that is to say, the guard plate 36 and the sleeve 39, may be quickly attached to or detached from the chuck mechanism and all the bores of the rock drill confronting the source of abradant are effectively sealed.

I claim:

1. In a rock drill, the combination of a casing and a working implement extending thereinto, a guard in slidable engagement with the casing, resilient means interlocked with the casing to retain the guard on the casing, and means on the resilient means to seal the end of the casing.

2. In a rock drill, the combination of a casing and a working implement, a guard on the casing, a resilient sleeve on the casing to form an abutment for the guard, and a wall on the sleeve to encircle and engage the working implement.

3. In a rock drill, the combination of a front head and a working implement extending thereinto, a chuck in the front head to guide the working implement and extending exteriorly of the front head, a guard on the chuck overlying the end of the front head, a resilient sleeve interlockingly engaging the chuck and forming an abutment for the guard, and a wall on the sleeve frictionally engaging the working implement to seal the end of the chuck.

FRED M. SLATER.